(12) United States Patent
Yadav et al.

(10) Patent No.: US 11,312,467 B2
(45) Date of Patent: Apr. 26, 2022

(54) STIFFENER FOR AN AIRCRAFT ASSEMBLY

(71) Applicants: Airbus Operations GmbH, Hamburg (DE); Airbus SAS, Blagnac (FR)

(72) Inventors: Avinash Kumar Yadav, Bristol (GB); Vinayak Ramachandra Patil, Bristol (GB); Sven Hardy Werner, Bristol (GB)

(73) Assignees: AIRBUS OPERATIONS GmbH, Hamburg (DE); AIRBUS SAS, Blagnac (FR)

(*) Notice: Subject to any disclaimer, the term of this patent is extended or adjusted under 35 U.S.C. 154(b) by 482 days.

(21) Appl. No.: 16/227,898

(22) Filed: Dec. 20, 2018

(65) Prior Publication Data

US 2019/0193830 A1    Jun. 27, 2019

(30) Foreign Application Priority Data

Dec. 21, 2017    (IN) .............................. 201741046087

(51) Int. Cl.
  *B64C 1/06*    (2006.01)
  *B64C 1/00*    (2006.01)

(52) U.S. Cl.
  CPC .............. *B64C 1/061* (2013.01); *B64C 1/064* (2013.01); *B64C 1/069* (2013.01); *B64C 2001/0072* (2013.01)

(58) Field of Classification Search
  CPC ......... B64C 1/064; B64C 3/182; B64C 1/061; B64C 2001/0072
  See application file for complete search history.

(56) References Cited

U.S. PATENT DOCUMENTS

| | | | |
|---|---|---|---|
| 4,109,435 | A | 8/1978 | Loyd |
| 4,828,202 | A | 5/1989 | Jacobs et al. |
| 5,024,399 | A | 6/1991 | Barquet et al. |
| 2006/0208135 | A1 | 9/2006 | Liguore et al. |
| 2011/0089291 | A1 | 4/2011 | Dietrich et al. |
| 2011/0097554 | A1 | 4/2011 | Kehrl et al. |
| 2015/0321742 | A1 | 11/2015 | Mialhe et al. |
| 2015/0367929 | A1 | 12/2015 | Mialhe et al. |

FOREIGN PATENT DOCUMENTS

| | | |
|---|---|---|
| EP | 1311426 | 5/2003 |
| EP | 1762666 | 3/2007 |
| EP | 2433781 | 3/2012 |
| EP | 3 156 321 | 4/2017 |
| WO | 2016/181085 | 11/2016 |

OTHER PUBLICATIONS

Combined Search and Examination Report for GB Application No. 1801789.7, dated Jul. 17, 2018, 6 pages.
Extended European Search Report for EP Application No. 18213212.6, 14 pages, dated Apr. 15, 2019.
Extended European Search Report for Application No. GB 21210895.5, six pages, dated Feb. 14, 2022.

*Primary Examiner* — Richard R. Green
(74) *Attorney, Agent, or Firm* — Nixon & Vanderhye P.C.

(57) ABSTRACT

A stiffener for an aircraft assembly is disclosed. The stiffener provides structural stability to the aircraft assembly. The stiffener has a first stiffener part having a planar web portion and a second stiffener part arranged with the first stiffener part. The second stiffener part includes a corrugated web portion having a corrugation. The present application also relates to an aircraft assembly, a fuselage for an aircraft, an aircraft and a method of forming a stiffener for an aircraft assembly.

19 Claims, 5 Drawing Sheets

STIFFENER FOR AN AIRCRAFT ASSEMBLY

CROSS RELATED APPLICATION

This application claims priority to India Patent Application 201741046087, filed Dec. 21, 2017, the entire contents of which are hereby incorporated by reference.

FIELD OF THE INVENTION

The present invention relates to a stiffener to an aircraft assembly. In particular, the present invention relates to a stiffener for providing structural stability to an aircraft assembly The present invention also relates to an aircraft assembly, a fuselage for an aircraft, an aircraft and a method of forming a stiffener for an aircraft assembly.

BACKGROUND OF THE INVENTION

Fuselage structures for an aircraft comprise a panel, acting as a fuselage skin, stringers extending longitudinally along the fuselage and stiffeners or frames extending perpendicular to the stringers. The stringers and stiffeners are fixed to the skin to provide structural support. The frames are typically C-shape, L-shape or Z-shape hoop profiles.

The stiffeners are typically either integral stiffeners or frames; that is the frames are fixed to the skin, or differential stiffeners or frames; that is the frames are fixed in a spaced relationship to the skin. With differential frames, clips mount the frames to the skin between stringers. Cleats are used to connect the frames to the stringers, in particular to prevent the frames from bowing, by lateral-torsional buckling, when they are mechanically stressed. With integral frames, the frames are directly fixed to the skin, with openings formed in the frames to receive stringers therethrough. Stabilisers are provided at the openings to provide lateral stability.

The use of numerous parts including clips, cleats and stabilisers leads to a complex assembly. As such, the complexity of their form involve significant costs. Assembling the numerous clips, cleats and stabilisers is a complex and time consuming process.

SUMMARY OF THE INVENTION

According to an aspect of the present invention, there is provided a stiffener for an aircraft assembly, the stiffener comprising: a first stiffener part having a planar web portion which is planar in a longitudinal direction along the first stiffener part; and a second stiffener part arranged with the first stiffener part; wherein the second stiffener part comprises a corrugated web portion having a corrugation.

Beneficially, stability in the normal direction; that is along a longitudinal axis of the stiffener, is provided by the planar web portion, and further stability is provided in another direction by the corrugated web portion. With this arrangement, stiffness of the stiffener is provided in the normal, lateral and transverse directions is provided and as such the need for auxiliary clips, cleats, and stabilisers is minimised or removed. Furthermore, the weight of the stiffener assembly for a desired stiffness may be minimised.

The corrugation may extend transverse to a longitudinal axis of the planar web portion. As such, further lateral stability is provided.

The stiffener may comprise a plurality of corrugations spaced apart along the longitudinal length of the web.

With this arrangement, a desired stiffness may be provided along the length of the web. The complexity of manufacturing the stiffener may be minimised.

The stiffener may comprise a core disposed in the corrugation between the planar web portion and the corrugated web portion.

Beneficially, the core provides added stability to the stiffener.

The core may be sandwiched between the planar web portion and the corrugated web portion.

The core may comprise a polymer block. Optionally, the block comprises Nomex. Optionally, the block is formed from one or more of PVC foam, and Polyurethane foam.

The core may comprise a column.

The planar web portion and corrugated web portion may form a web, and the stiffener may comprise a foot extending from the web.

The core may extend from the foot to a free end of the stiffener.

At least one of the first stiffener part and second stiffener part may overlap the core at the free end.

The stiffener may comprise a prepreg layer between the planar web portion and the corrugated web portion.

The first stiffener part may have at least one of a C-shape, L-shape and Z-shape profile. The second stiffener part may have at least one of a C-shape, L-shape and Z-shape profile. The stiffener may have at least one of a C-shape, L-shape, I-shape, Z-shape and J-shape profile.

The stiffener may comprise an opening configured to receive a stringer between the or each pair of corrugations.

According to an aspect of the present invention, there is provided a stiffener for an aircraft assembly comprising a stiffener part having a planar web portion which is planar in a longitudinal direction along the first stiffener part and a foot; and a block extending transverse to the longitudinal direction of the stiffener part between the foot and a free end.

The stiffener may be a frame for a fuselage of an aircraft.

According to an aspect of the present invention, there is provided an aircraft assembly comprising a panel, a stringer and a stiffener as set out above.

The stringer may be configured to extend through the stiffener, and the stiffener may be configured to mount to the panel.

The stringer may be configured to be disposed between the stiffener and the panel, and the stiffener may be configured to mount to the stringer.

The aircraft assembly may comprise a stabiliser configured to mount between the panel and the stiffener.

According to an aspect of the present invention, there is provided an aircraft fuselage comprising the stiffener as set out above.

According to an aspect of the present invention, there is provided an aircraft fuselage comprising the aircraft assembly as set out above.

According to an aspect of the present invention, there is provided a method of forming a stiffener for an aircraft assembly, the method comprising: holding a first stiffener part having a planar web portion which is planar in a longitudinal direction of the first stiffener part; holding a second stiffener part having a corrugated web portion including a corrugation; disposing a core in the corrugation; and sandwiching the core between the first stiffener part and the second stiffener part.

According to an aspect of the present invention, there is provided a stiffener for an aircraft assembly, the stiffener comprising: a first stiffener part having a planar web portion; and a second stiffener part arranged with the first stiffener part.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
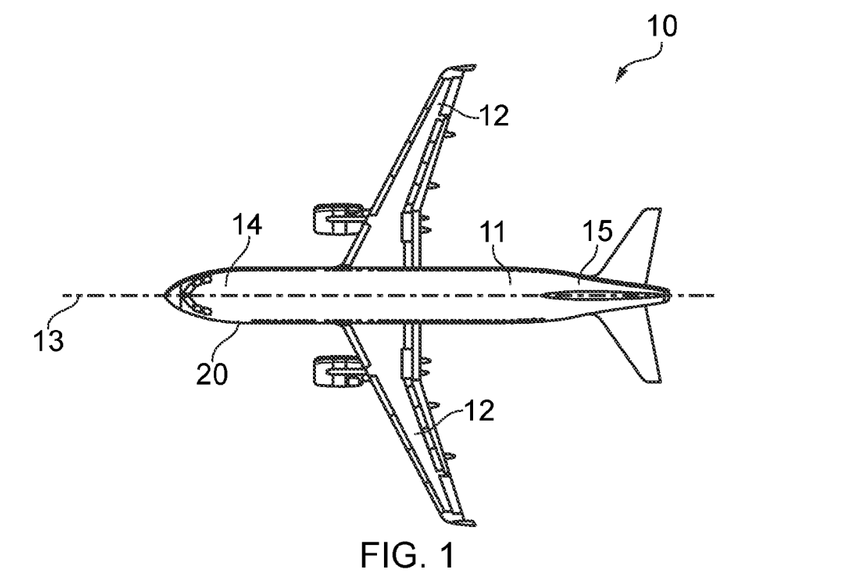
FIG. 1 is a plan view of an aircraft having a fuselage structure.

An aircraft 10 is shown in FIG. 1. The aircraft 10 includes a fuselage 11. Two wings 12 extend from the fuselage 11. It will be appreciated that the fuselage 11 and wings 12 may take a variety of different plan formed shapes and profiles depending on the particular application. The fuselage 11 defines a longitudinal axis 13. The longitudinal axis 13 extends from a forward end 14 to a rearward end 15. Each wing 12 comprises a wing box. The wing box forms the main body of the wing 12.

In the following description, the term "front" refers to components towards the leading edge of the wing, and the term "rear" refers to components towards the trailing edge of the wing. The terms "forward" and "rearward" shall be construed accordingly. The position of features may be construed relative to other components, for example a forward component may be disposed on a forward side of another component, but towards the rear of the wing.

The fuselage 11 comprises a fuselage structure 20. The fuselage structure 20 is generally tubular. The fuselage structure 20 extends along the longitudinal axis 13. The fuselage structure 20 may be formed from a plurality of assembly sections.

Figures 2, 3:
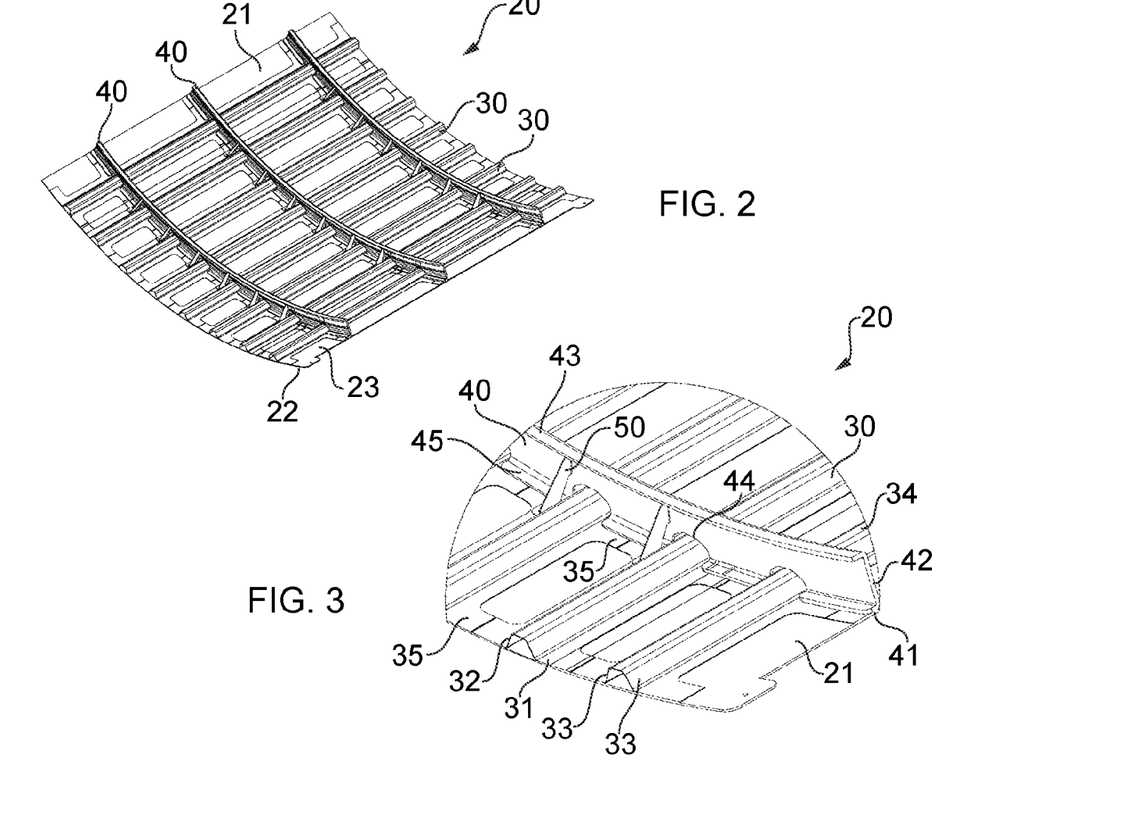
FIG. 2 is a perspective view showing a known configuration of a portion of a fuselage structure.
FIG. 3 is a perspective view showing the known configuration of the portion of the fuselage structure of FIG. 2.
Figure 4:
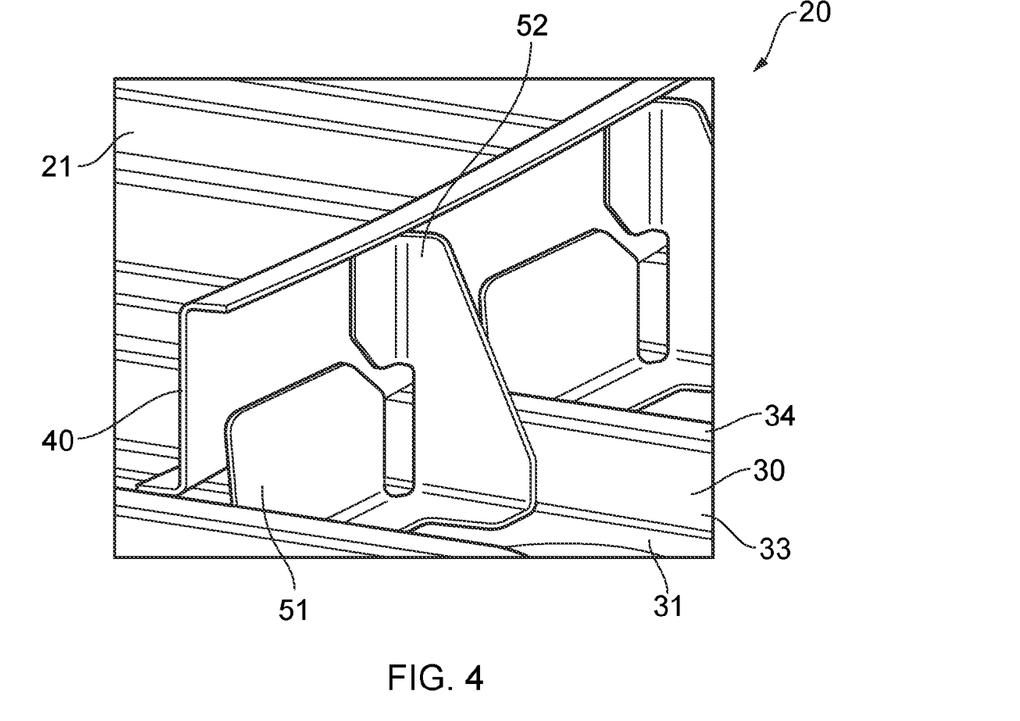
FIG. 4 is a perspective view showing another known configuration of a portion of a fuselage structure.
Figure 5:
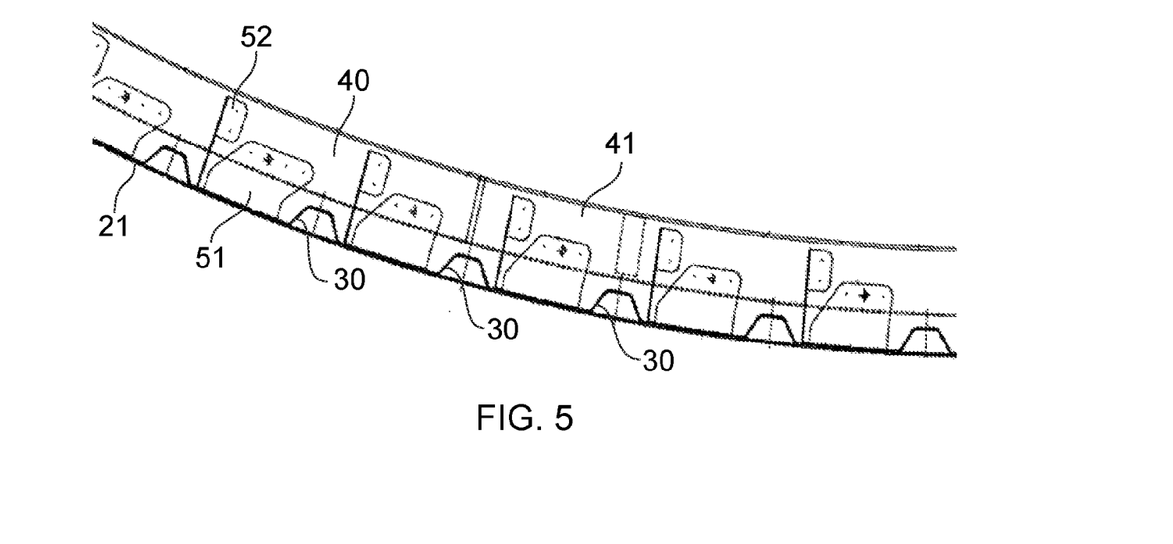
FIG. 5 is a front view showing another known configuration of a portion of the fuselage structure.

Referring to FIGS. 2 to 4, known arrangements of a fuselage structure is shown. FIGS. 2 and 3 show a known arrangement of a fuselage structure known as an integral frame configuration, and FIGS. 4 and 5 show another known arrangement of a fuselage structure known as a differential frame configuration.

The fuselage structure 20 comprises a panel 21. The panel 21 acts as a fuselage skin. The panel 21 is arcuate. The panel 21 has an outer side 22 and an inner side 23. The panel 21 is formed from a composite material, a metallic material or a combination thereof. The fuselage structure 20 comprises stringers 30 and stiffeners, also known as frames, 40. The stiffeners 40 extend perpendicular to the stringers 30. The stringers 30 and stiffeners 40 are fixed to the skin to provide structural support.

Stringers 30 extend along the inner side 23 of the panel 21. The stringers 30 extend longitudinally along the fuselage 11. The stringers 30 are elongate members. The stringers 30, as shown in FIGS. 2 and 3, have a U-shape profile. Such a profile is known as a 'top-hat' stringer arrangement. The stringers 30 each have at least one stringer foot 31. The or each stringer foot 31 mounts to the panel 21. In FIGS. 2 and 3, each stringer 30 has two stringer feet 31. In FIGS. 4 and 5, each stringer has one stringer foot 31. The stringers 30 each have an upstanding portion 32 protruding from the panel 21. The upstanding portion 32 is formed by at least one stringer web 33 extending from the at least one stringer foot 31. Each stringer 30 has two stringer webs 33 with a flange 34 at a free end. The flange extends between the stringer webs 33. The stringers 30 have extended flange portions 35. The extended flange portions 35 extend perpendicular to the longitudinal axis of the stringer 30. The extended flange portions 35 extend from the stringer feet 31. In FIGS. 2 and 3, the stiffeners 40 locate on the extended flange portions 35. The extended flange portions 35 extend parallel to the longitudinal axis of each stiffener 40.

The stiffeners 40, also known as frames, extend on the inner side 23 of the panel 21. The stiffeners 40 are indirectly mounted to the panel 21. The stiffeners 40 mount to the stringers 30. The stiffeners 40 extend perpendicular to the longitudinal axis of the fuselage 11. The stiffeners 40 extend in a hoop-wise arrangement. As such, the stiffeners are arcuate.

In FIGS. 2 and 3, the integral frame configuration is shown. The stiffeners 40 are fixed, for example by bolting or bonding to the panel 21. The stiffeners 40, as shown in FIGS. 2 and 3, have a C-shape profile. The stiffener 40 has a stiffener foot 41, a stiffener web 42 and a stiffener flange 43. Openings 44 are formed through the stiffeners 40. The openings 44 extend from the lower end of the stiffener 40, and are known as 'mouse holes'. The openings 44 separate the stiffener foot 41 into a plurality of stiffener foot portions 45. The openings 44 are spaced apart along the longitudinal length of the stiffener 40. The spacing of the openings 44 corresponds to the spacing of the stringers 30 on the panel 21. When assembled, the stringers 30 are received in the openings 44. The rib foot 41 mounts to the panel 21. The rib foot 41 mounts to the panel 21 via the extended flange portions 35.

Stabilisers 50 extend from the panel 21 to the stiffener 40. The stabilisers 50 extend at an arcuate angle between the stringer foot 31 and or inner side 23 of the panel 21, and the stiffener web 42. The stabilisers 50 provide lateral stability to the stiffeners 40.

In FIGS. 4 and 5, the differential frame configuration is shown. The stiffeners 40 are spaced from the panel 21 by the stringers 30. That is, the stiffeners 40 are disposed at an opposing end of the stringer webs 33. Each stiffener 40, as shown in FIGS. 4 and 5, have a Z-shape profile. The stiffeners 40 are fixed, for example, by bolting or bonding to at least one of the stringer flanges 34 and clips 51. The clips 51 mount the stiffeners 40 to the panel 21. Cleats 52 extend between the panel 21 and the stiffener 40. The cleats 52 provide lateral stability to the stiffeners 40. One clip and one cleat is disposed between a pair of adjacent stringers 30. In the present arrangement the one clip 51 and cleat 52 in each gap between the adjacent stringers 30 are integrally formed. It will be understood that the clips 51 and cleats 52 may be separably formed. Each clip extends substantially across the gap between the adjacent stringers 30.

In the arrangement shown in FIG. 4, the stiffeners 40 abut the stringer flanges 34. In the arrangement shown in FIG. 5, the stiffeners 40 are spaced from the stringers.

As shown in FIGS. 6 to 11, embodiments of the present invention will now be described. The arrangement of the panel 21 and stringers 30 is generally the same as described above with reference to FIGS. 2 to 5 and so a detailed description will be omitted. However, the extended flange portions are omitted. In an alternative embodiment, extended flange portions are present. In the embodiments of the present invention, the configuration of the stiffeners is different. The stiffeners according to the embodiments described herein have a self-supporting arrangement. The panel 21 and stiffeners 70 are formed from plies of composite material, although the make-up and materials of the panel and stiffeners may differ.

Figure 6:
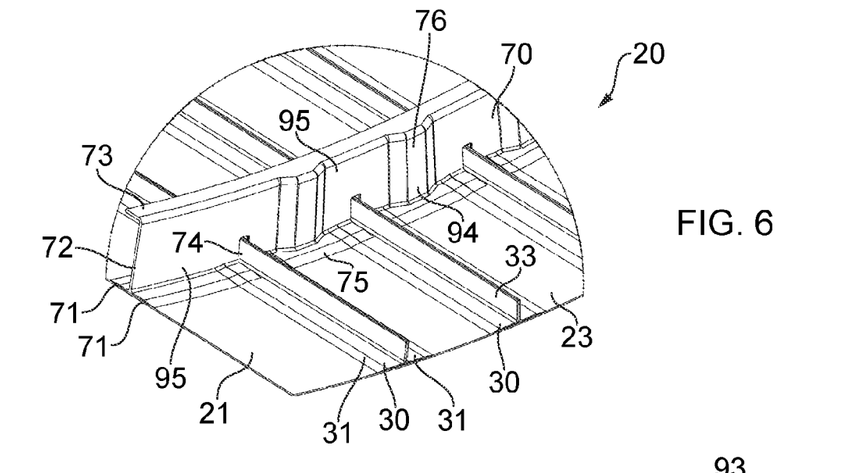
FIG. 6 is a perspective view of a portion of a fuselage structure according to the present invention.

In FIG. 6, an integral frame configuration is shown. The fuselage structure 20 comprises the panel 21 and the stringers 30 substantially as described above. However, the fuselage structure 20 is shown with T-shape profile stringers 30 having the stringer feet 31 extending from each side of the stringer web 33. It will be understood that the configuration of the stringers 30 may vary. Different configurations of stringers may be disposed on the panel 21. Alternatively, for example, the stringers may have a T-shape, U-Shape, Z-shape, L-shape or I-shape profile.

In FIG. 6, one stiffener, or frame, 70 is shown. It will be understood that the number of stiffeners 70 may vary. The stiffeners 70 extend perpendicular to the stringers 30. Adjacent stiffeners 70 are spaced apart from one another. The stiffener 70 has a J-shape profile. The shape of the frame may vary. The stiffeners 70 may have, for example, C-shape, L-shape or Z-shape profile. The stiffeners 70 extend on the inner side 23 of the panel 21. The stiffeners 70 are directly mounted to the panel 21 and the stringers 30. The stiffeners 70 extend perpendicular to the longitudinal axis of the fuselage 11. The stiffeners 70 extend in a hoop-wise arrangement. As such, the stiffeners are arcuate. The stiffeners 70 are formed from plies of composite material, although the make-up and materials of the stiffeners may differ.

The stiffeners 70 are fixed, for example by bolting or bonding to the panel 21. The stiffener 70 has a stiffener foot 71 extending from each side of a stiffener web 72. In the present embodiment, each stiffener feet 71 are fixed directly to the inner side 23 of the panel 21. In an alternative embodiment with extended flange portions extending from the stringers 30, the stiffener feet 71 are fixed to the panel 21 via the stringers 30. A stiffener flange 73 is at the free end of the stiffener web 72, spaced from the stiffener foot 71. The stiffener flange 73 extends perpendicularly from the stiffener web 72. The stiffener feet 71 and stiffener flange 73 extend perpendicular to the stiffener web 72. The arrangement may differ. For example, with a C-shape or Z-Shape profile, each stiffener 70 has the stiffener foot 71 extending from one side of the stiffener web 72 only.

Openings 74 are formed through the stiffeners 70. The openings 74 extend from the lower end of the stiffener 70, and are known as 'mouse holes'. The openings 74 separate the stiffener feet 71 into a plurality of stiffener foot portions 75. The openings 74 are spaced apart along the longitudinal length of the stiffener 70. The spacing of the openings 74 corresponds to the spacing of the stringers 30 on the panel 21. When assembled, the stringers 30 are received in the openings 74. The stiffener feet 71 mount to the panel 21. The stiffener feet 74 affix to the panel 21.

The stiffeners 70 have expanded portions 76. The expanded portions 76 are spaced along each stiffener 70. Three expanded portions 76 are visible in FIG. 6, however it will be understood that the number and spacing of the expanded portions 76 may differ. The expanded portion 76 protrudes from an opposing side of the stiffener 70 to the stiffener flange 73. The expanded portion 76 is part of a corrugated surface. One expanded portion 76 is disposed between each adjacent pair of openings 74. The expanded portion 76 extends from the stiffener foot 71 to the free end.

Figure 7:
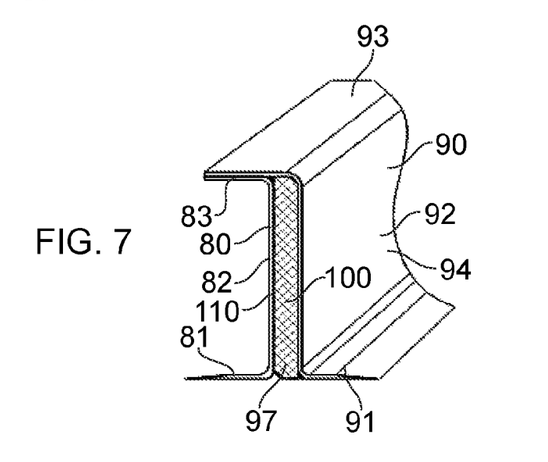
FIG. 7 is a cross-sectional perspective view of a stiffener of the fuselage support shown in FIG. 6, through an expanded region.

Referring now to FIG. 7, one stiffener 70 is shown in cross-section through the expanded portion 76. The stiffener 70 comprises a first stiffener part 80 and a second stiffener part 90. The first stiffener part 80 has a C-shape profile. The first stiffener part 80 comprises a foot portion 81, a planar web portion 82, and a flange portion 83. The second stiffener part 90 has a Z-shape profile. The second stiffener part 90 comprises a foot portion 91, a corrugated web portion 92 and a flange portion 93.

The planar web portion 82 of the first stiffener part 80 is planar in the normal direction; that is in the direction of the longitudinal length of the stiffener 70. The planar web portion 82 does not have any bends or kinks along the longitudinal length. The planar web portion 82 provides hoop loading in the normal direction. The first stiffener part foot and flange portions 81, 83 extend parallel to each other. The foot portion 81 is formed to correspond to the alignment of the inner side 23 of the panel 21 and the stringers 30.

The corrugated web portion 90 comprises corrugations 94. The corrugations 94 form the expanded portions 76. The corrugations 94 extend transverse to the longitudinal axis of the stiffener 70. A linear section 95 is disposed between each pair of corrugations 94. The linear sections 95 are planar. The linear sections 95 are configured to align with the planar web portion 82 of the first stiffener part 80. The corrugations 94 are configured to be spaced from the first stiffener part 80. Each corrugation 94 is generally U-shaped.

When the stiffener 70 is formed, the linear sections 95 are aligned with the planar web portion 82 of the first stiffener part 80; the web feet 81, 82 extend in opposing directions; and the flange portions 83, 93 overlap each other. The corrugations 94 form a space 97 between the first and second stiffener parts 80, 90. The flange portion arrangement encloses the free end of the corrugation 94. In the present arrangement the flange portion 93 of the second stiffener part 90 encloses the corrugation. In an alternative arrangement, the flange portion 83 of the first stiffener part 80 encloses the corrugation.

A core 100 is disposed in each corrugation 94. The core 100 is sandwiched between the first and second stiffener parts 80, 90. The core 100 is formed from a block. In the present embodiments, the core is formed from a polymer block, such as Nomex™. Other suitable materials may be used, such as PVC foam and Polyurethane foam. The core 100 is formed as a column. The core conforms to the shape of the corrugation 94 by which the core 100 is received. When sandwiched between the first and second stiffener parts 80, 90, the core 100 extends between the stiffener feet 71 and the free end. The core 100 is enclosed at the free end. The core 100 is preformed and disposed between the first and second stiffener parts 80, 90. Alternatively, the core is formed by inserting material into the space between the first and second stiffener parts 80, 90 and subsequently curing the material. The core 100 fills the space. The core 100 may be omitted.

An internal prepreg layer 110 is disposed between the first stiffener part 80 and the second stiffener part 90. Corresponding prepreg layers may be disposed along an inner side of each of the first stiffener part 80 and the second stiffener part 90. The core 100 may be disposed between the prepreg layers. The core 100 lies against the prepreg layer 110.

Figure 8:
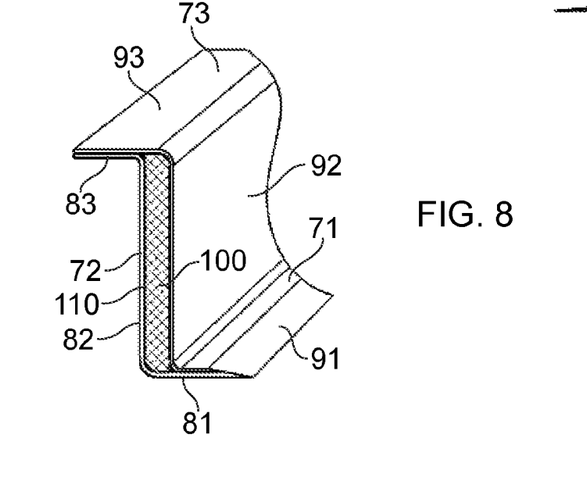
FIG. 8 is a cross-sectional perspective view of an alternative stiffener, through an expanded region.

The profile of the first and second stiffener parts 80, 90 may differ. For example, the first stiffener part 80 may have an L-shape or Z-shape profile, and the second stiffener part 90 may have a C-shape or L-shape profile. FIG. 8 shows an alternative embodiment in which the first stiffener part 80 has a Z-shape profile and the second stiffener part 90 has a corresponding Z-shape profile. The foot portion 81 of the first stiffener part 80 and the foot portion 91 of the second stiffener part 91 overlap to form one stiffener foot 71. The flange portion 83 of the first stiffener part 80 and the flange portion 93 of the second stiffener part 91 overlap to form one stiffener flange 73. The core 100 extends between the stiffener foot 71 and the stiffener flange 73.

Figure 9:
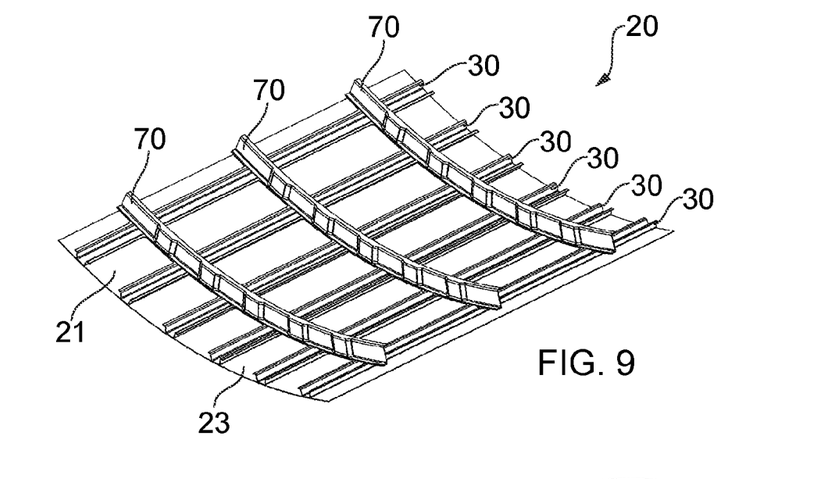
FIG. 9 is a perspective view of an alternative arrangement of a portion of a fuselage structure according to the present invention.
Figure 10:
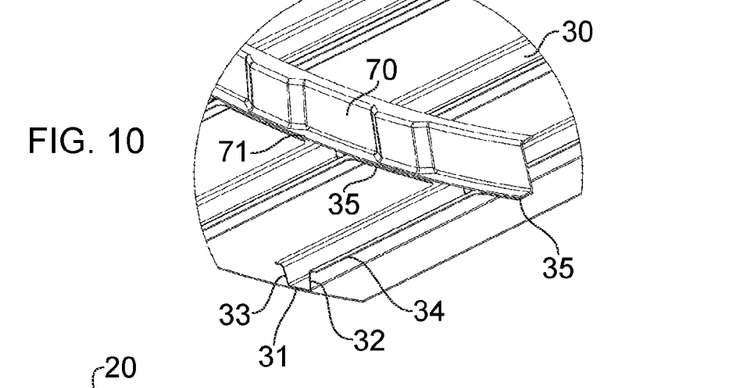
FIG. 10 is a perspective view of the arrangement of the portion of the fuselage structure shown in FIG. 9.
Figure 11:
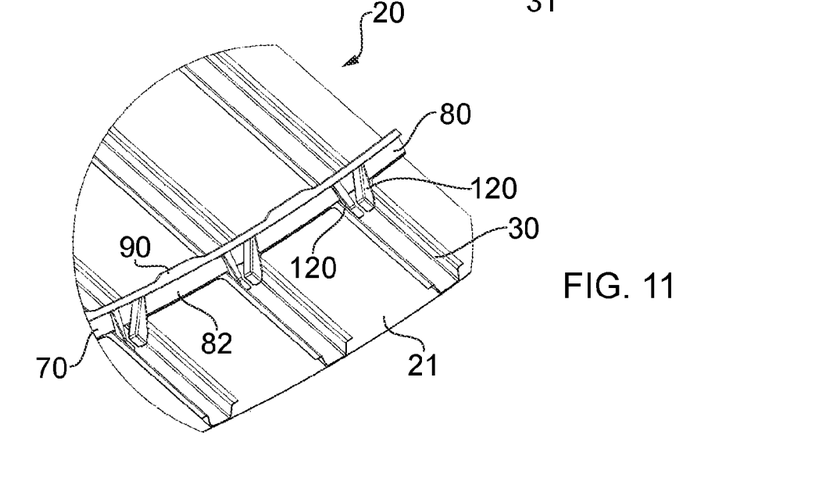
FIG. 11 is a perspective view of the arrangement of the portion of the fuselage structure shown in FIG. 10.

Referring to FIGS. 9 to 11, a differential frame configuration is shown. The fuselage structure 20 comprises the panel 21 and the stringers 30 substantially as described above. However, the fuselage structure 20 is shown with a reversed U-shape profile stringer arrangement. In this arrangement, the stringer is disposed with the stringer foot 31 disposed on the inner side 23 of the panel, with two stringer webs 33 upstanding from each edge of the stringer foot 31. One stringer flange 34 extends from the free end of each stringer web 33. Extended flange portions 35 extend from the stringer flange 34. In this differential frame configuration, the stiffeners 70 are disposed on the stringer flanges 34. The stiffeners 70 are disposed on the extended flange portions 35. It will be understood that the configuration of the stringers 30 may vary. Different configurations of stringers may be disposed on the panel 21. Alternatively, or additionally, for example, the stringers may have a T-shape, U-Shape, Z-shape, L-shape or I-shape profile.

In FIG. 9, three stiffeners, or frame, 70 is shown. It will be understood that the number of stiffeners 70 may vary. The stiffeners 70 extend perpendicular to the stringers 30. Adjacent stiffeners 70 are spaced apart from one another. The stiffener 70 has a Z-shape profile. The shape of the frame may vary. The stiffeners 70 may have, for example, C-shape, L-shape or J-shape hoop profile. The stiffeners 70 are directly mounted to the stringers 30. The stiffeners 70 are spaced from the inner side 23 of the panel 20 by the stringers 30. The stiffeners 70 extend perpendicular to the longitudinal axis of the fuselage 11. The stiffeners 70 extend in a hoop-wise arrangement. As such, the stiffeners are arcuate. The stiffeners 70 are formed from plies of composite material, although the make-up and materials of the stiffeners may differ.

The stiffeners 70 are fixed, for example by bolting or bonding to the stringers 30. As shown in FIG. 11, stabilisers 120 extend between the inner side 23 of the panel 30 and the stringers 30. The stabilisers 120 are disposed at each stringer 30. The stabilisers 120 are disposed in pairs at each stringer 30, although the number of stabilisers 120 may differ. The stabilisers 120 are mounted to the planar web portion 82 of the first stiffener part 80. The stabilisers 120 aid the transfer of loading to the panel 21, and so help to minimise the thickness of at least part of the stringers 30, for example the stringer flange.

The arrangement of the stiffener 70 of the differential frame configuration is generally the same as the arrangement of the stiffener 70 described above with reference, in particular, to FIGS. 6 and 8. As such a detailed description will not be repeated. It will be understood that the openings 75 provided for integral frame configurations may be omitted with differential frame configurations. In the present embodiment, each stiffener feet 71 are fixed directly to the stringer flanges 34 and extended flange portions 35. The extended flange portions 35 may be omitted. The stiffener feet 74 affix to the stringers 30.

The corrugated web portion 90, together with the core 100, removes the need for clips which attach the stiffeners to the panels. Furthermore, the size, number and weight of any components mounting the stiffeners to the panel 20 in addition to the stringers 30 is significantly minimised.

The corrugations 94 provide lateral stability. The core 100 aids the lateral stability. By sandwiching the core 100 between two structural layers it is possible to maximise the lateral stability. The sandwiched arrangement aids the stiffness of the stiffener web 72. By providing corrugations in one part of the stiffener web 72 and maintaining a planar configuration in another part, it is possible to provide lateral stability whilst retaining hoop loading along the longitudinal length of the stiffener 70. As such, lateral stability is formed as an inherent part of the structure. Such an arrangement removes or limits the need for additional clips, cleats and stabilisers.

Referring now to FIGS. 12a-12d, the method of forming the stiffener 70 will now be described. The method will be described with reference to the stiffener 70 described above with reference to FIGS. 6 and 7, however it will be understood that alternative stiffener embodiments may be formed. It will also be understood that the stiffener 70 may be formed by an alternative process. A tool 125 is provided to form the stiffener 70. The tool 125 comprises a male tool 130 and a female tool 140.

Figure 12A:
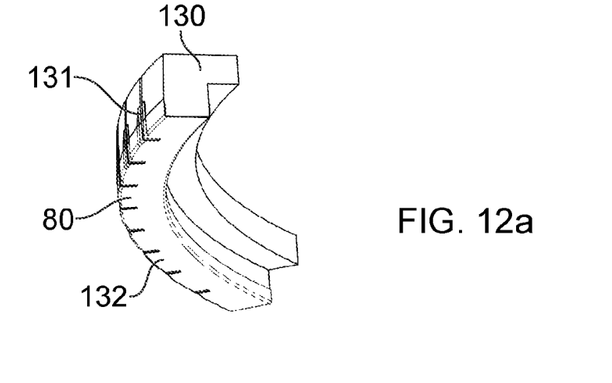
FIGS. 12a-12d show the method of forming a stiffener of a fuselage support for an aircraft.

In FIG. 12a, the male tool 130 is provided. The male tool 130 is configured to form the profile of the first stiffener part 80. The male tool 130 has the profile of the first stiffener part 80. Cut-outs 131 are formed in the tool to define features of the first stiffener part 80, for example the openings 74. Prepreg sheets 132 are disposed on the male tool 130. The first stiffener part 80 may be in a cured or uncured state depending on the stage at which curing is performed.

Figure 12B:
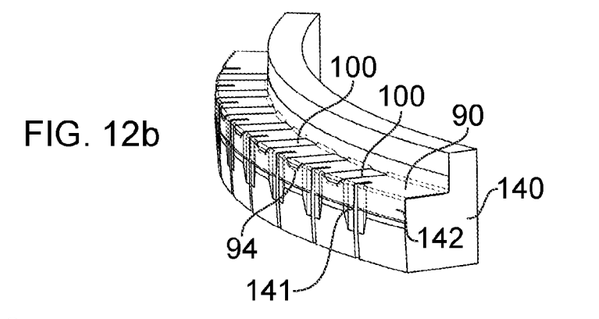

In FIG. 12b, the female tool 140 is provided. The female tool 140 is configured to form the profile of the second stiffener part 90. The female tool 140 has the profile of the second stiffener part 90. Cut-outs 141 are formed in the tool to define features of the second stiffener part 90, for example the openings 74. Prepreg sheets 142 are disposed on the female tool 140. The second stiffener part 90 may be in a cured or uncured state depending on the stage at which curing is performed. The second stiffener part 90 is laid on the female tool with the corrugations 94 defined therein. The internal prepreg layer 110 is disposed on an inner side of the second stiffener part 90.

Figure 12C:
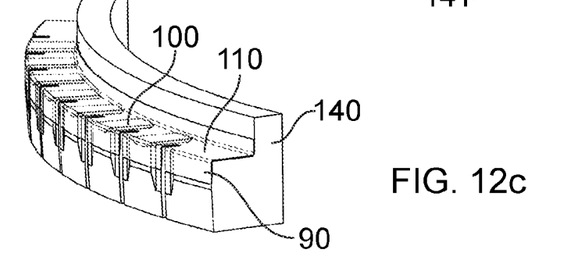

The core 100 is disposed in each of the channels formed by the corrugations 94. The core 100 extends in a radial direction. The core 100 is preformed in the present arrangement. As shown in FIG. 12c, the internal prepreg layer 110 is disposed over the core 100 on the second stiffener part 90.

Figure 12D:
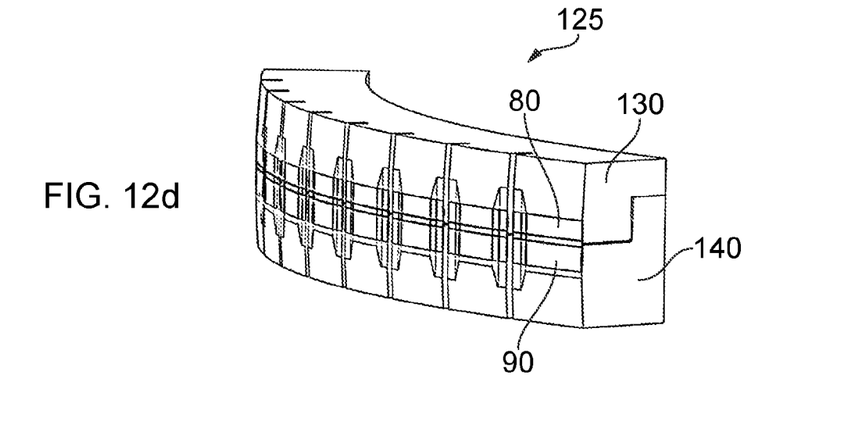

In FIG. 12d, the male and female tool are brought together to form the assembled stiffener 70. The male and female tools 130, 140 align the first and second stiffener parts 80, 90. The assembled stiffener is cured, with the first and second stiffener parts 80, 90 being bonded together. In the present arrangement the stiffener 70 is cured separately from the panel 21 and stringers 30. In an alternative arrangement, the stiffener 70 is cured together with the panel 21 and stringers 30, that is in situ. As such the stiffener tool may form part of an assembly tool.

Although the embodiments above are described by reference to an aircraft fuselage, it will be understood that the arrangements described herein are applicable to other aircraft assemblies. For example, the aircraft assembly may be an aircraft wing.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A stiffener for an aircraft assembly comprising:
   a first stiffener part having a planar web portion which is planar in a longitudinal direction along the stiffener part and a foot;
   a second stiffener part having a corrugated web portion including a corrugation, and linear sections on each side of the corrugation;
   a space between the first stiffener part and the corrugated web portion of the second stiffener part; and
   a block extending transverse to the longitudinal direction of the stiffener part from the foot of the first stiffener part to a free end,
   wherein the stiffener is a frame for a fuselage of an aircraft, the stiffener extends in a hoop-wise arrangement, the block is enclosed at the free end, the block fills the space between the first and second stiffener parts, the block is disposed in the corrugation, and the block is not disposed between the planar web portion and the linear sections.

2. An aircraft assembly comprising a panel, a stringer and a stiffener of claim 1.

3. The aircraft assembly of claim 2, wherein the stringer is configured to extend through the stiffener, and the stiffener is configured to mount to the panel.

4. The aircraft assembly of claim 2, wherein the stringer is configured to be disposed between the stiffener and the panel, and the stiffener is configured to mount to the stringer.

5. The aircraft assembly of claim 4, comprising a stabiliser configured to mount between the panel and the stiffener.

6. An aircraft fuselage comprising the stiffener of claim 1.

7. An aircraft fuselage comprising a panel, stringers, and stiffeners which extend in a hoop-wise arrangement, wherein the stiffeners extend perpendicular to the stringers, each stiffener comprising:
   a first stiffener part having a planar web portion which is planar in a longitudinal direction along the first stiffener part;
   a second stiffener part arranged with the first stiffener part, wherein the second stiffener part comprises a corrugated web portion, the corrugated web portion comprising a plurality of corrugations spaced apart along a longitudinal length of the web, and a linear section disposed between each pair of corrugations; and
   a plurality of cores, each core disposed in a respective one of the corrugations between the planar web portion and the corrugated web portion, each core extending transverse to the longitudinal direction of the first stiffener part from a foot of the first stiffener part to a free end.

8. The aircraft fuselage of claim 7, wherein each corrugation extends transverse to a longitudinal length of the planar web portion.

9. The aircraft fuselage of claim 7, wherein each core is sandwiched between the planar web portion and the corrugated web portion.

10. The aircraft fuselage of claim 7, wherein each core comprises a polymer block.

11. An aircraft fuselage comprising a panel, stringers, and stiffeners which extend in a hoop-wise arrangement, wherein the stiffeners extend perpendicular to the stringers, each stiffener comprising:
    a first stiffener part having a planar web portion which is planar in a longitudinal direction along the first stiffener part;
    a second stiffener part arranged with the first stiffener part, wherein the second stiffener part comprises a corrugated web portion, the corrugated web portion comprising a plurality of corrugations spaced apart along a longitudinal length of the web; and
    a plurality of cores, each core disposed in a respective one of the corrugations between the planar web portion and the corrugated web portion, wherein each core comprises a column.

12. The aircraft fuselage of claim 7, wherein the planar web portion and corrugated web portion form a web.

13. The aircraft fuselage of claim 12, wherein each core extends from the foot to a free end of the stiffener.

14. The aircraft fuselage of claim 13, wherein at least one of the first stiffener part and second stiffener part overlaps the core at the free end.

15. The aircraft fuselage of claim 7, wherein each stiffener comprises a prepreg layer between the planar web portion and the corrugated web portion.

16. The aircraft fuselage of claim 7, wherein the first stiffener part has at least one of a C-shape, L-shape and Z-shape profile, and the second stiffener part has at least one of a C-shape, L-shape and Z-shape profile.

17. The aircraft fuselage of claim 7, wherein each stringer is configured to extend through each stiffener, and each stiffener is configured to mount to the panel.

18. The aircraft fuselage of claim 17, wherein each stringer is configured to be disposed between the stiffeners and the panel, and each stiffener is configured to mount to each stringer.

19. A method of forming a stiffener for an aircraft fuselage, wherein the stiffener extends in a hoop-wise arrangement, the method comprising:
    holding a first stiffener part having a planar web portion which is planar in a longitudinal direction of the first stiffener part, wherein the first stiffener part is in an uncured state;
    holding a second stiffener part having a corrugated web portion including a plurality of corrugations spaced apart along a longitudinal length of the web, and a linear section disposed between each pair of corrugations, wherein the second stiffener part is in an uncured state;
    disposing cores in the corrugations, each core extending transverse to the longitudinal direction of the first stiffener part from a foot of the first stiffener part to a free end;
    sandwiching the cores between the first stiffener part and the second stiffener part; and curing the assembled stiffener, with the first and second stiffener parts being bonded together.

* * * * *